JOHN D. PARROT.
Improvement in Reversible Filters.
No. 126,325. Patented April 30, 1872.
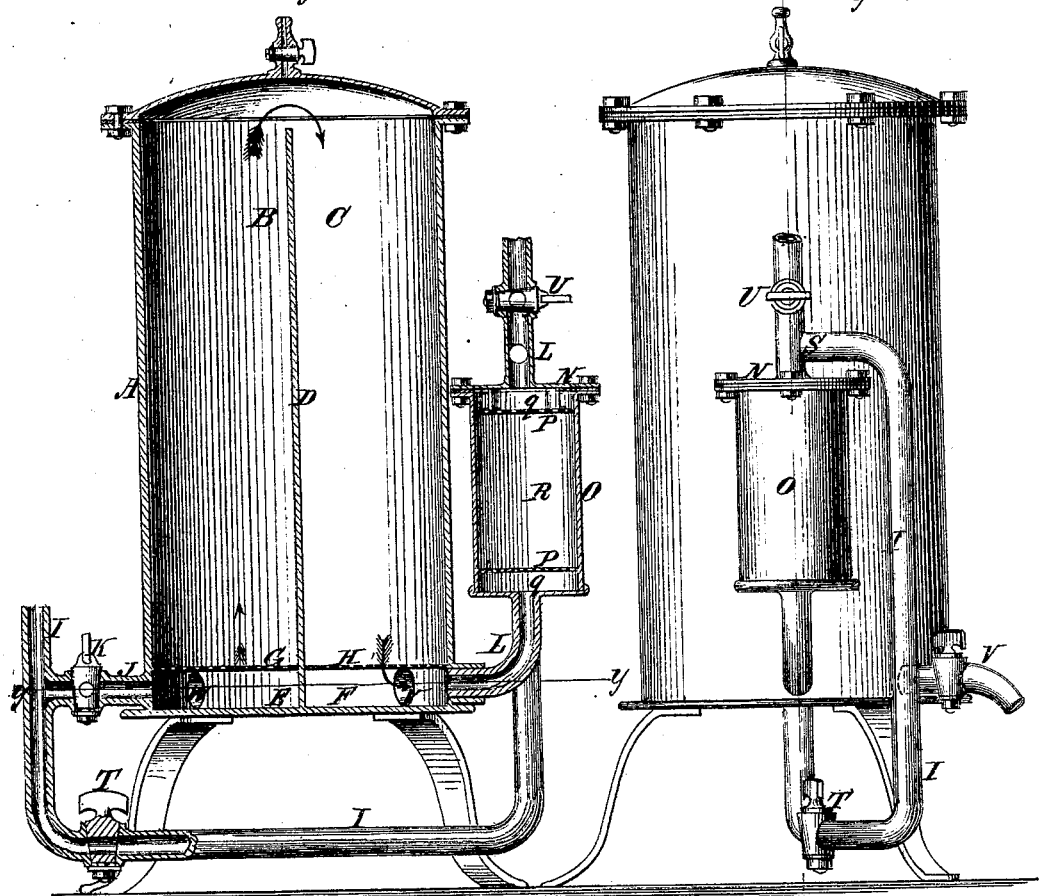

126,325

UNITED STATES PATENT OFFICE.

JOHN D. PARROT, OF MORRISTOWN, NEW JERSEY, ASSIGNOR TO HIMSELF AND HENRY McCAULEY, OF SAME PLACE.

IMPROVEMENT IN REVERSIBLE FILTERS.

Specification forming part of Letters Patent No. 126,325, dated April 30, 1872.

Specification describing a new and useful Improvement in Reversing Apparatus for Water-Filters, invented by JOHN D. PARROT, of Morristown, in the county of Morris and State of New Jersey.

This invention relates to a device for filtering and purifying water or other liquids; and consists in apparatus for reversing the flow of the water or other liquid through the filter for cleansing the filtering material and chambers thereof, as will be hereinafter described.

In the accompanying drawing, Figure 1 represents a vertical section of a filter constructed according to my invention with my reversing apparatus attached, the section being taken on the line $x\ x$ of Fig. 2. Fig. 2 is an elevation of the same. Fig. 3 is a horizontal section of Fig. 1 taken on the line $y\ y$.

Similar letters of reference indicate corresponding parts.

A is a water-filter for which Letters Patent of the United States, dated July 30, 1869, were granted me; and the object of the present invention is to perfect the same and render it more useful than it has hitherto been; and for this purpose I attach to it a reversing apparatus, consisting of pipes and cocks, by means of which the flow of water may be reversed and the filtering material and the chambers of the filter may be cleansed at any time. As seen in the drawing, the filter is divided into two compartments, B and C, by the vertical partition D. At the bottom of the filter are two compartments or chambers, E and F, divided by the partition D and separated from the filtering compartments or chambers B C by the perforated bottoms G H. The chambers B C are filled with filtering material, and the course of the water through the filter is indicated by arrows. The service-pipe from the water-main is attached to the pipe I, which pipe is connected with the chamber E by the short pipe J, in which is the stop-cock K. L is the outlet pipe from the pure-water chamber F. This pipe L may deliver the water directly for use in the house, but in this example of my invention I connect it to an auxiliary filter-vessel, N, composed of a cylinder, O, to each of the heads of which is attached a perforated diaphragm, P, leaving a chamber, $q$, at each end, while the space R between the perforated diaphragms is filled with sponge or other filtering material, to more perfectly filter the water. I do not confine myself to the use of this auxiliary filter, as it may not always be necessary. It may be used as a filtering-vessel or as a part of the discharge-pipe L, or be disconnected altogether, as may be found advisable. The pipe I connects with the discharge-pipe L at the point S. T is a stop-cock in I, and U is a stop-cock in the discharge-pipe. V is a faucet which connects with the chamber F and W is a faucet which connects with the chamber E. When the filter is in use the cock T is closed and the cocks K and V are open. To reverse the current of water through the filter the cocks K and U are closed and the cock T is opened. The water then rushes through the pipe I to the point S and then into the filter, through the discharge-pipe L, or filtering-vessel N, passing reversely through the filtering-chambers C B, and out through the discharge-faucet W. This thoroughly cleanses the filtering material in a few minutes, when the cock T is again closed and the cocks K and U are opened and the filter is ready for use again.

Any sediment which may settle in either of the chambers E and F may be discharged at any time by opening the faucets V or W.

I do not confine myself to the precise form or arrangement of any of the parts described, as they may be varied in many ways without departing from my invention.

Having thus described my invention, I claim as new and desire to secure by Letters Patent—

The service-pipe I, having stop-cock T and branch J with stop-cock K, and the chamber O with pipe L having cock U, in combination with a filter having the faucets V W, arranged as and for the purpose described.

JOHN D. PARROT.

Witnesses:
GEO. W. MABEE,
T. B. MOSHER.